United States Patent [19]

Yamashita et al.

[11] Patent Number: 4,907,677
[45] Date of Patent: Mar. 13, 1990

[54] FRICTION BRAKE MATERIAL WITH CARBON AND FERROUS PORTIONS

[75] Inventors: Yukinori Yamashita; Kouichi Iwata; Seigou Sakagami, all of Hyogo, Japan

[73] Assignee: Sumitomo Electric Industries, Ltd., Osaka, Japan

[21] Appl. No.: 147,865

[22] Filed: Jan. 25, 1988

[30] Foreign Application Priority Data

Mar. 31, 1986 [JP] Japan .................................. 61-74635

[51] Int. Cl.⁴ ..................... F16D 65/00; F16D 65/10; F16D 69/00
[52] U.S. Cl. ............................. 188/73.1; 188/218 XL; 188/251 M
[58] Field of Search ............ 188/18 A, 218 XL, 73.1, 188/250 B, 250 G, 251 M, 251 A, 234, 251 R, 73.2; 192/107 M, 107 C, 85 AA, 107 R; D12/180

[56] References Cited

U.S. PATENT DOCUMENTS

| 2,122,405 | 7/1938 | Bocklus et al. | 192/107 M |
| 3,243,019 | 3/1966 | Lallemant | 188/218 XL |
| 3,552,533 | 1/1971 | Nitz et al. | 192/107 M |
| 3,759,353 | 9/1973 | Marin | 192/107 M X |
| 3,951,240 | 4/1976 | Dowell et al. | 188/251 A X |
| 4,214,651 | 7/1980 | Cunningham | 188/73.2 X |
| 4,259,397 | 3/1981 | Saito et al. | 188/251 A X |
| 4,473,140 | 9/1984 | Komori | 188/250 G |

FOREIGN PATENT DOCUMENTS 0993013 10/1951 France .................. 188/250 B
233531 10/1987 Japan .

Primary Examiner—Robert J. Oberleitner
Attorney, Agent, or Firm—Cushman, Darby & Cushman

[57] ABSTRACT

A friction brake of a type which comprises at least one friction element and a counter-friction element frictionally engageable with the friction element. One of the friction and counter-friction elements is made of carbon and the other of the friction and counter-friction elements is comprised of at least two first and second portions both engageable simultaneously with such one of the friction and counter-friction elements during a braking operation. The first portion of such other of the friction and counter-friction elements is made of the same carbon material and the second portion thereof is made of ferrous material.

7 Claims, 3 Drawing Sheets

FRICTION BRAKE MATERIAL WITH CARBON AND FERROUS PORTIONS

BACKGROUND OF THE INVENTION

1. Field of the Invention

The present invention generally relates to a friction brake used in automotive vehicles, aircraft landing gears, railroad cars and similar vehicles and, more particularly, to friction linings or pads used in the friction brake.

Specifically, the present invention pertains to the friction brake of a type comprising at least one friction element, such as a friction lining or pad, and a counter-friction element such as a driven member adapted to be braked by and in contact with the friction element.

2. Description of the Prior Art

The friction brake of the type referred to above is well known in the art such as exemplified by a single- or double-block brake, an external shoe brake and an internal shoe brake. In the automobile industry of today, for example, the external shoe brake is generally represented by the disk brake and the internal shoe brake is represented by the drum brake. In any event, the friction brake now widely used generally comprises at least one friction element or pad supported for movement in a direction close towards and away from a counter-friction or driven member movable relative to the friction pad, the movement of the driven member being braked when the friction pad is brought in contact therewith to apply a torsional friction force to the driven member.

More specifically, in the case of the automotive disk brake, the driven member is constituted by a brake disk mounted on a wheel axle for rotation together therewith, and the friction pad is disposed on each side of the brake disk, one or both of the friction pads being supported by means of a respective brake shoe for linear movement in a direction generally at right angles to the plane of rotation of the brake disk and also in a direction close towards and away from the brake disk. This equally applies to the drum brake except that the drum brake makes use of a drum, instead of the brake disk in the disk brake, and of the friction pads adapted to move in respective opposite directions either close towards each other (in external type) or away from each other (in internal type) to apply torsional friction forces to the peripheral wall of the drum.

Whatever the specific construction of the friction brake is, the friction brake wherein both of the friction pad and the driven member are made of carbon has come to be used in practice. Because of the frictional contact occurring between the carbon material in the friction pad and the carbon material in the driven member, this type of prior art friction brake can provide a high frictional resistance even when a high speed sliding contact takes place between the friction pad and the driven member. The use of carbon for each of the friction pad and the driven member brings about additional advantages in that any possible variation in frictional resistance with change in temperature can be minimized and in that, since the carbon itself has a high resistance to elevated temperature and a high thermal conductivity, the friction brake can be used in the environment where generation of frictional heat is considerable. Accordingly, the prior art friction brake utilizing carbon for both of the friction pad and the driven member is considered superior to, and is effective to provide a higher braking effectiveness than, the other prior art friction brake utilizing metal for both of them.

Moreover, the use of carbon makes it possible to manufacture a relatively light-weight friction brake that is suited for use in aircraft landing gears in which, because of the presence of high speed and high load environments, much difficulty is involved in adopting the friction brake utilizing metal for the friction pad and the driven member.

However, the use of carbon has been found posing a problem in that, after a long period of braking at low speed, a lubricating film tends to be formed on the contact surface of each of the friction pad and the driven member, accompanied by detrimental reduction in coefficient of friction. Therefore, if the prior art friction brake is used after the repeated braking at low speed to halt the driven member being driven at moderate or high speed, no braking effectiveness would be substantially available because of the presence of the lubricating films.

In order to obviate this problem, attempts have been made to add either chopped carbon fibers or continuous carbon filament fibers to carbon, but have not satisfactorily succeeded in the removal of the problem.

Accordingly, the friction brake employing carbon for each of the friction element and the counter-friction element cannot be effectively utilized in an application in which a substantially stabilized braking performance is required over a wide range from a low speed operating condition to a high speed operating condition. This can also be evidenced by the results of experiment conducted in an attempt to substantially obviate the above discussed problem.

Table 1 below illustrates change in coefficient of friction with change in sliding speed, that is, speed of relative sliding between the brake disk and the friction pads, which was attained when the brake disk, 240 mm in size and 22 mm in thickness, made of carbon and driven in one direction at a predetermined speed, and the friction pads each made of carbon and applied to the brake disk at a pressing force of 10 kg/cm$^2$ for 10 seconds. The relative sliding speed was measured at a point on the brake disk spaced 194 mm from the axis of rotation of the brake disk.

As can be understood from Table 1 below, while the contact surface of each of the friction and counter-friction elements in the friction brake is recommended to give a coefficient of friction within the range of 0.3 to 0.4, the coefficient of friction has decreased with reduction in sliding speed.

TABLE 1

| Sliding Speed (m/min.) | Friction Coefficient |
| --- | --- |
| 0.36 | 0.16 |
| 3.61 | 0.18 |
| 36.11 | 0.16 |
| 180.55 | 0.36 |
| 361.10 | 0.32 |
| 577.76 | 0.31 |

Table 2 below illustrates change in coefficient of friction with types of material used for the friction and counter-friction elements. The relative sliding speed between the brake disk and the friction pads at the time of measurement was 36.11 m/min.

As can be understood from Table 2 below, while a relatively high coefficient of friction has been exhibited by a combination of carbon with a ferrous material such as the carbon steel and the gray cast iron, a reduced coefficient of friction has been exhibited by a combination of the carbon with any one of carbon, alumina and silicon carbide.

TABLE 2

| Material of Friction Pads | Material of Disk Brake | Coefficient Friction |
| --- | --- | --- |
| Carbon | Carbon | 0.16 |
| " | Alumina | 0.11 |
| " | Silicon Carbide | 0.15 |
| " | Gray Cast Iron | 0.37 |
| " | Medium Carbon Steel* | 0.37 |
| " | High Carbon Steel** | 0.35 |
| " | Low Alloyed Steel | 0.33 |
| " | Stainless Steel | 0.33 |
| " | Incoloy | 0.31 |
| " | Inconel | 0.30 |
| " | Hastelloy | 0.31 |
| " | Stellite | 0.32 |

*0.35% carbon.
**0.60% carbon.

Observation on the contact surface of each of the friction and counter-friction elements tested has shown that the contact surface of the element made of the ferrous material has been roughened with frictional scratches, that is, marks of friction, left thereon as extending in a direction parallel to the direction in which the relative sliding took place. Also, it has shown that, although the combination of carbon with the ferrous material did not result in the formation of lubricating films on the contact surface of any one of the elements, the combination of carbon with the other material than the ferrous material resulted in the formation of lubricating films on the contact surface of both of the elements.

Summarizing the above, friction between the elements, one made of carbon and the other of the ferrous material results in the formation of frictional scratches with little chance of formation of lubricating films, and therefore, it appears that a high coefficient of friction could be obtained even at a low speed operating condition.

Table 3 below illustrates change in coefficient of friction with change in sliding speed, that is, speed of relative sliding between the friction and counter-friction elements, after the friction and counter-friction elements, one made of carbon and the other of the ferrous material, have been brought into sliding contact with each other. The test conditions are substantially identical with those described in connection with Table 1 except for the difference in material used for the disk brake and the friction pads.

TABLE 3

| Sliding Speed (m/min.) | Friction Coefficient |
| --- | --- |
| 0.36 | 0.35 |
| 3.61 | 0.30 |
| 36.11 | 0.37 |
| 180.55 | 0.30 |
| 361.10 | 0.23 |
| 577.76 | 0.19 |

As can be understood from Table 3 above, a relatively high coefficient of friction is exhibited at a low speed operating condition, but decreases at a high speed operating condition.

SUMMARY OF THE INVENTION

The present invention having been based on the above described findings is intended to provide an improved friction brake wherein merits of the carbon and of the ferrous material are utilized to make the friction brake capable of exhibiting a highly stabilized braking performance over a wide range from a low speed operating condition to a high speed operating condition.

To this end, in accordance with the present invention, there is disclosed a friction brake of a type comprising at least one friction element and a counter-friction element adapted to be braked by and in contact with the friction element, wherein one of the friction and counter-friction elements is made of carbon and the other of the friction and counter-friction elements is comprised of at least two first and second portions both engageable simultaneously with said one of the friction and counter-friction elements. The first portion of such other of the friction and counter-friction elements is made of the same carbon material and the second portion thereof is made of ferrous material.

In one preferred embodiment of the present invention, the element made of carbon may be the friction lining or pad, the element comprised of the at least first and second portions may be the driven member. Where the driven member is a brake disk, the first and second portions may be annular portions of the brake disk which lie in the same plane of rotation of the brake disk.

In another preferred embodiment of the present invention, the element made of carbon may be the driven member and the element comprised of the at least first and second portions may be the friction lining or pad.

Where the element made of carbon and the element comprised of the first and second portions are constituted by the driven member and the friction lining or pad, respectively, the first and second portions may be connected together in butted fashion or, alternatively, one of the first and second portions is embedded in the other of the first and second portions with a contact surface of such one of the first and second portions substantially held in flush with a corresponding contact surface of such other of the first and second portions.

In any event, the carbon which may be employed in the practice of the present invention may be carbon solids such as high-strength carbon or carbon-carbon composite. On the other hand, instead of the ferrous material, ferrous alloys, nickel alloys or cobalt alloys may be used.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

In describing the present invention in connection with some preferred embodiments thereof, reference will be made to brake linings as used in a friction brake of caliper type only for the purpose of illustration, not for defining the scope of the present invention.

Figure 1:
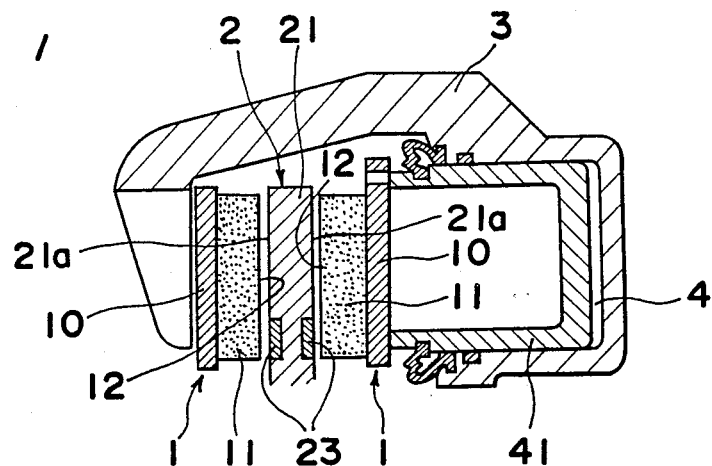
FIG. 1 is a schematic sectional view of a caliper-type friction brake, taken in a direction generally transverse of the plane of rotation of a brake disk.

Referring first to FIG. 1, the friction brake of caliper type to which the present invention is applicable comprises a caliper housing 3 designed to straddle a brake disk 2, extending from one side of the brake disk 2 to the opposite side thereof over the outer periphery of the brake disk 2. The brake disk 2 is mounted in any suitable manner on a wheel axle or hub for rotation together therewith and splined to the wheel axle or hub so that the brake disk 2 can be rotatable together with the wheel axle or hub.

One of the opposite ends of the caliper housing 3, for example, a right-hand end thereof as viewed in FIG. 1, carries a hydraulic cylinder. The hydraulic cylinder has a variable-volume cylinder chamber 4 defined in the right-hand end of the caliper housing 3 and includes a piston 41 that is accords-dated within the cylinder chamber 4 for sliding movement relative to the right-hand end of the caliper housing 3 between retracted and projected positions in a direction generally at right angles to the brake disk 2 and in a direction facing the opposite, left-hand end of the caliper housing 3.

Retainer plates, or brake shoes, generally identified by 1, are joltingly connected to the piston 41 and the left-hand end of the caliper housing 3 to occupy respective positions generally between the piston 41 and the brake disc 2 and between the left-hand end of the caliper housing 3 and the brake disk 2. Each of the retainer plates 1 has a respective friction pad 11 fitted replaceably thereto so as to confront the brake disk 2.

The caliper-type disc brake of the construction so far described with reference to FIG. 1 is well known in the art and, therefore, further details thereof, such as the presence of dust boots and piston seals, a hydraulic circuit and a specific manner in and by which some components of the brake are connected or associated, will not be reiterated herein for the sake of brevity. However, the operation of the above described disc brake will be describes briefly for a better understanding of the present invention.

Referring still to FIG. 1, assuming that the piston 41 is held in the retracted position as shown and a fluid medium under pressure is subsequently supplied into the variable-volume cylinder chamber 4 with the volume thereof increasing consequently, the piston 41 is driven towards the projected position with the right-hand friction pads 11 brought into contact, at the friction pad surface 12, with a right-hand contact surface 21a, of the brake disc 2 then being rotated. After the contact between the right-hand friction pad 11 and the rotating brake disk 2 has taken place, the continued movement of the piston 41 towards the projected position draws the left-hand friction pad 11 against the opposite, left-hand contact surface of the brake disk 2. Thus, the friction pads 11 in effect grip the rotating brake disk 2 applying torsional friction forces to the rotating brake disc 2 from both sides, thereby to slow the rotating brake disk 2 down or bring it to rest.

In accordance with a first preferred embodiment of the present invention, each of the friction pads 11 shown in FIG. 1 is made of carbon such as high-strength carbon or carbon-carbon composite. Alternatively, depending on a particular application of the friction brake, each of the friction pads 11 made of carbon may be either in the form of a thin layer itself or in the form of a thin layer adapted to be secured to the associated retainer plate 10 through any suitable block intervening between it and the associated retainer plate 10.

Figure 2:
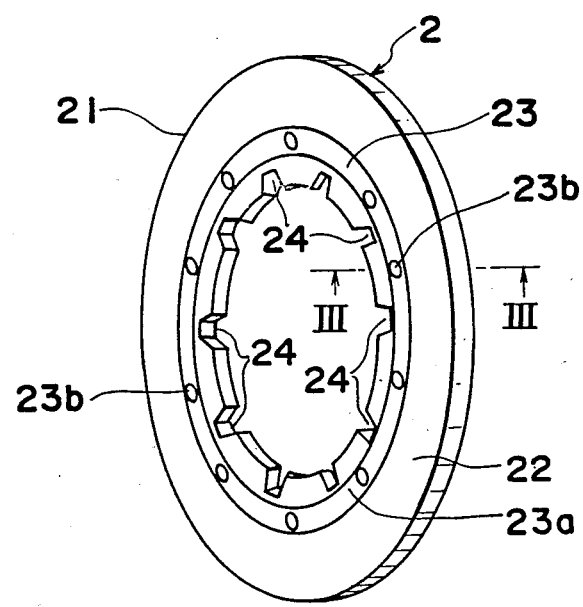
FIG. 2 is a schematic perspective view of the brake disk.
Figure 3:
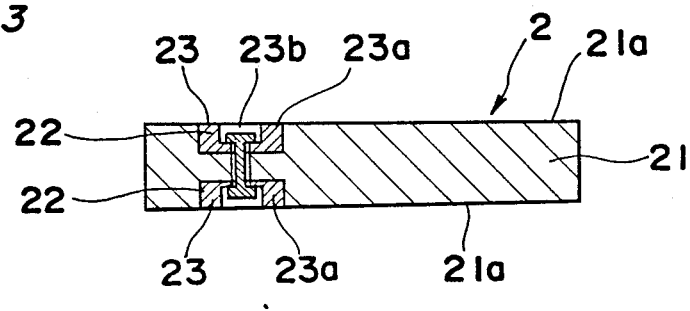
FIG. 3 is a cross-sectional view of the brake disk taken along the line III—III in FIG. 2.

On the other hand, according to the embodiment shown in FIG. 1, as best shown in FIGS. 2 and 3, the brake disk 2 has an annular body 21 made of carbon and also has its opposite annular surface areas 21a formed with respective annular recesses 22 each opening outwardly in a direction transverse to the annular body 21. These annular recesses 22 are defined adjacent the inner peripheral edge of the annular body 21 in coaxial relationship with respect to the axis of rotation of the brake disk 2 and preferably spaced an equal distance inwardly of the annular body 21 from the inner peripheral edge thereof. It is to be noted that-the inner peripheral edge of the annular body 21 is formed with a plurality of circumferentially equally spaced splined grooves, generally identified by 24, for engagement with complementary projections (not shown) formed on the wheel axle or hub so that the brake disk 2 can rotate together with the wheel axle or hub.

Friction rings generally identified by 23 and made of dissimilar material to the material for the annular body 21, specifically ferrous material, for example, iron, nickel or cobalt, are embedded in the respective annular recesses 22 and connected firmly together with the annular body 21 and also together with each other through a plurality of rivets each extending between one friction ring 23 to the other friction ring 23 across the annular body 21 as best shown in FIG. 3. Care must be taken to avoid the protrusion of heads of each rivet outwardly beyond the adjacent contact surface areas 21a of the annular body 21 and, for this purpose, each of the friction rings 23 have defined therein a circular recess 23b for receiving therein the associated head of each of the rivets, said circular recess 23b having a depth greater than the thickness of the head of each rivet.

With the friction rings 23 so embedded in the respective annular recesses 22, an annular contact surface area 23a of any one of the friction rings 23 is so ground, or otherwise pre-dimensioned or machined in any suitable manner, as to be held flush with the adjacent contact surface area 21a of the annular body 21.

So far illustrated, each annular recess 22 and, hence, each friction ring 23, is so positioned that only a portion of the respective friction pad 11 which is located radially inwardly with respect to the brake disk 2 can be brought into sliding engagement with the annular contact surface area 23a of the associated friction ring 23.

Thus, it will readily be understood that the opposite contact surfaces of the brake disk 2 with which the associated friction pads 11 are frictionally engaged during an braking operation are defined by combinations of the contact surface areas 21a of the annular body 21 and annular contact surfaces 23a of the associated friction rings 23, respectively. This means that, when the brake disk 2 is braked, i.e., gripped by the friction pads 11 from opposite directions close towards each other, each of the friction pad 11, being made of carbon, is brought into contact with the dissimilar materials used to form the brake disk 2, that is, the respective annular body 21, made of carbon, and the respective friction ring 23. Considering the results of experiment illustrated in and discussed with reference to the foregoing tables, Table 2 and Table 3, it will readily be understood that the friction brake embodying the present invention can give a relatively high coefficient of friction over a wide range of sliding speed from a low speed operating condition to a high speed operating condition of the brake disk 2.

More specifically, Table 2 has made it clear that while a relatively high coefficient of friction can be given by a combination of the carbon material with the ferrous material at a low speed operating condition of the brake disk, but a combination of the carbon material with the carbon material can give a high coefficient of friction at a high speed operating condition of the brake disk. The use of the carbon material in each of the friction pads 11 and both of the carbon and ferrous materials in the brake disk 2 such as accomplished in the present invention is effective to render merits of one of the dissimilar material to compensate for demerits of the other of the dissimilar material, and therefore, the friction brake according to the present invention as a whole can exhibit a braking effectiveness over a wide range of operating speed of the brake disk.

Figure 4:
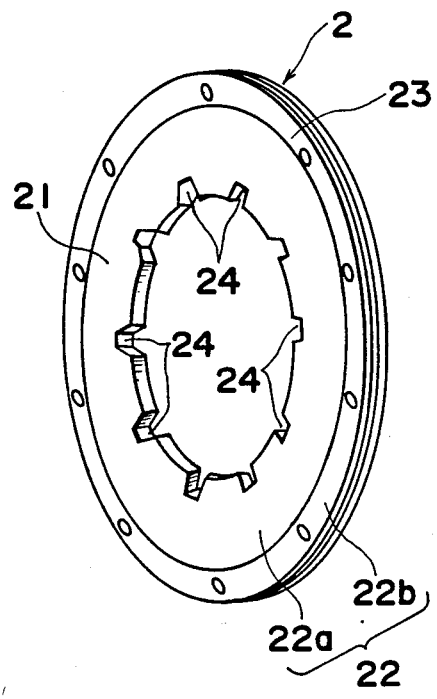
FIG. 4 is a perspective view of a variant of the brake disc shown in FIG. 2.

It is to be noted that, in the foregoing embodiment of FIGS. 1 to 3, the friction rings 23 have been shown and described as positioned adjacent the inner peripheral edge of the annular body 21 of the brake disk 2. However, they may be positioned along a circumference 22b adjacent the outer peripheral edge of the annular body 21 as shown in FIG. 4, or may be positioned at a generally radial location 22a generally intermediate of the width of the annular body 21. Also, they may be positioned adjacent the inner and outer peripheral edges of the annular body 21, respectively.

Figure 5:
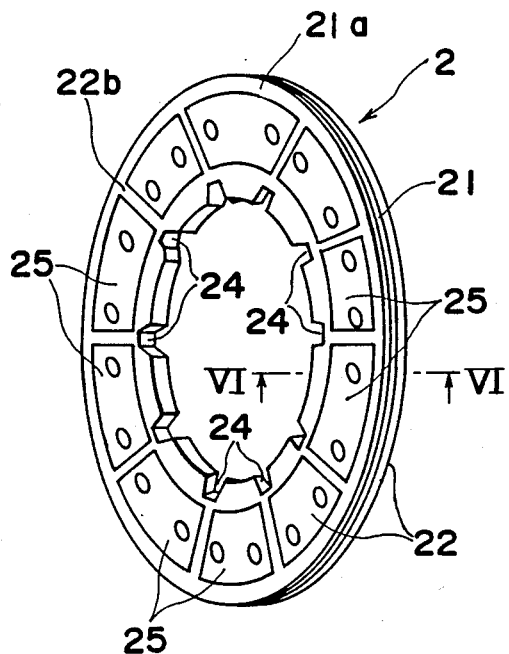
FIG. 5 is a perspective view of the brake disk, illustrating a second preferred embodiment of the present invention.

Instead of the use of the friction rings 23, a plurality of friction segments made of ferrous material and generally identified 25 may be employed such as shown in FIG. 5. According to the embodiment of FIG. 5, each of the opposite contact surface areas 21a of the annular body 21 of the brake disk 2 is formed with a circular row of generally arcuate recesses 22b in which the respective friction segments 25 are embedded. Preferably, these arcuate recesses 22b in each annular contact surface area 21a are spaced an equal distance from each other in a direction circumferentially of the brake disk 2 and also radially inwardly from the outer peripheral edge of the annular body 21.

The friction segments 25 embedded in the circular row of the arcuate recesses 22b in one of the opposite contact surface areas 21a of the annular body 21 and those in the other of the opposite contact surface areas 21a of the same annular body 21 are firmly connected together with each other also with the annular body 21 by means of rivets.

Figure 6:
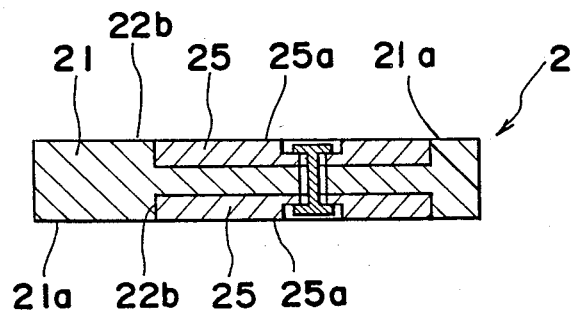
FIG. 6 is a cross sectional view of the brake disk taken along the line VI—VI in FIG. 5.

In this embodiment of FIGS. 5 and 6, the opposite contact surfaces of the brake disk 2 with which the friction pads 11 are frictionally engaged during an braking operation are defined by combinations of the contact surface areas 21a of the annular body 21 and annular contact surfaces 25a of the associated friction segments 25, respectively. Hence, it should be clear that the friction brake utilizing the friction pads 11 and the brake disk 2 constructed according to the embodiment of FIGS. 5 and 6 can exhibit a braking performance similar to that afforded by the friction brake according to the foregoing embodiment.

It is to be noted that, although in the foregoing description the annular body 21 of the brake disk has been described as made of carbon and the friction ring 23 or the friction segments 25 have been described as made of the ferrous material, the friction ring 23 or the friction segments 25 may be made of carbon and the annular body 21 may be made of the ferrous material.

Figure 7:
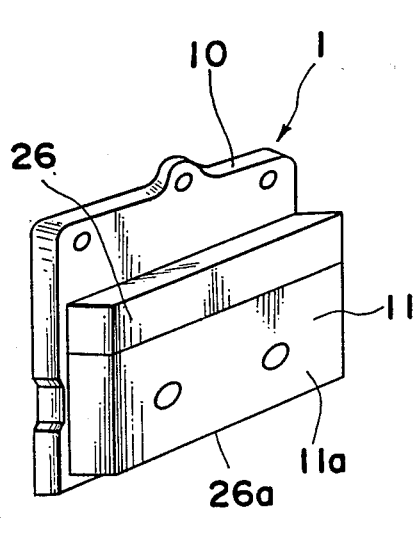
FIGS. 7 to 9 are perspective views of a brake shoe, illustrating third to fifth preferred embodiments of the present invention.
Figure 8:
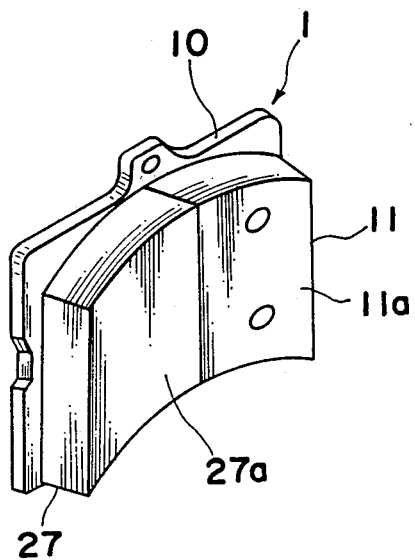
Figure 9:
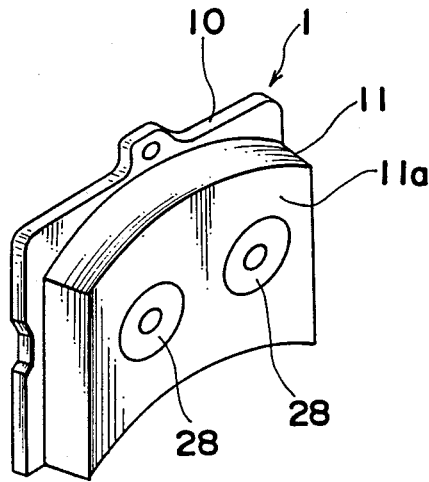

The following embodiments shown in FIGS. 7 to 9, respectively, illustrate the application of the present invention to each of the friction elements carried by the associated retainer plates 10. It is to be noted that, since the friction elements carried by the retainer plates 10 are of identical construction, reference will be made to only one of them in the description that follows.

Referring now to FIG. 7, the retainer plate 10 carries the friction pad 11 made of carbon and also a friction bar 26 made of the ferrous material. The friction bar 26 is connected to the retainer plate 10 and positioned above the friction pad 11 with respect to the direction radially of the brake disk 2. It is to be noted that the friction bar 26 may be positioned at 26a below the friction pad 11, provided that the contact surface of the friction element constituted by the contact surface area 11a of the friction pad 11 and the contact can align with the annular contact surface of the brake disk 2.

Where the friction element constructed according to the embodiment of FIG. 7 is employed, the brake disk 2 with which it can work satisfactorily may be either the one made of carbon or the one shown in and described with reference to any one of FIGS. 2 and 5. Particularly where the brake disk of the construction shown in and described with reference to any one of FIGS. 2 and 5 is employed in combination with the friction element according to the embodiment of FIG. 7, care must be taken that the ferrous material used in the friction element will not contact the ferrous material used in the brake disc 2.

In the embodiment shown in FIG. 8, a generally rectangular friction block 27 made of the ferrous material is connected to the retainer plate 10 and positioned in side-by-side relationship with the friction pad 11. The contact surface of the friction element according to the embodiment of FIG. 8 is constituted by the contact surface area 11a of the friction pad 11 and that contact surface area 27a of the friction block 27 which is held flush with the contact surface area 11a of the friction pad 11.

According to the embodiment of FIG. 8, the friction element can be effectively and satisfactorily used in combination of the brake disk made of the carbon.

In the embodiment shown in FIG. 9, the friction pad 11 made of carbon and connected to the retainer plate 10 is either recessed inwardly or perforated to provide spaced-apart pockets in which friction bushings 28 made of the ferrous material are embedded and anchored to the retainer plate 10 by means of respective rivets or any other suitable fastening members. In this embodiment, the contact surface of the friction element is constituted by the contact surface area 11a of the friction pad 11 and respective annular contact surface areas 28a of the friction bushings 28.

It is to be noted that, in practicing any one of the embodiments of the present invention shown in FIGS. 7 to 9, one of the friction pad 11 and the friction bar 26 or the friction block 27 or the friction bushings 28 may be formed integrally with the retainer plate 10 while the other of them may be anchored thereto, provided that the retainer plate 10 is made of the same material as that for such one of them, such as illustrated in any one of FIGS. 7 to 9.

To demonstrate the braking effectiveness, the friction brake of the construction shown in and described with reference to FIGS. 1 to 3 was tested. During the test, the friction pads each made of carbon and the brake disk of the construction shown in FIG. 2 having an outer diameter of 240 mm and a thickness of 22 mm were used under the test conditions identical with those described in connection with Table 1. The results of the tests are tabulated in Table 4 below.

TABLE 4

| Sliding Speed (m/min.) | Friction Coefficient |
|---|---|
| 0.36 | 0.31 |
| 3.61 | 0.32 |
| 36.11 | 0.33 |
| 180.55 | 0.36 |
| 361.10 | 0.31 |
| 577.76 | 0.30 |

From Table 4, it has now become clear that the friction brake according to the present invention is effective to give the coefficient of friction within the range of 0.3 to 0.4 which is generally considered necessary for a friction brake to exhibit a satisfactory braking performance over the range of low speed operating condition to high speed operating condition of the brake disk.

Although the present invention has been described in connection with the several preferred embodiments thereof with reference to the accompanying drawings, it is to be noted that various changes and modifications are apparent to those skilled in the art. By way of example, the present invention can be embodied by any friction brake wherein during a braking operation contact between the carbon material and the carbon material takes place simultaneously with contact between the carbon material and the ferrous material.

Also, other than the numerous types of friction brakes referred to in the beginning of this specification, the present invention can be equally applicable to a hand-operated brake used in an automotive vehicle or any other apparatuses.

Accordingly, such changes and modifications are to be understood as included within the scope of the present invention as defined by the appended claims.

We claim:
1. A friction brake comprising:
   a friction element; and
   a counter-friction element frictionally engageable with the friction element, one of the friction and counter-friction elements being made of carbon material and comprising one of a friction pad or brake disk while the other of the friction and counter-friction elements comprises the other of the friction pad or the brake disk and comprises at least first and second portions both engageable simultaneously with said one of the friction and counter-friction elements during a braking operation, said first portion of such other of the friction and counter-friction elements being made of the same carbon material and the second portion thereof being made of ferrous material, whereby the ferrous material contacts the carbon material of said one of the friction and counter-friction elements during the braking operation.
2. The friction brake as claimed in claim 1, wherein the element made of carbon is a friction pad, and the element comprising at least first and second portions is a brake disk.
3. The friction brake as claimed in claim 2, wherein the first and second portions are respective annular portions of the brake disk which lie in the same plane of rotation of the brake disk.
4. The friction brake as claimed in claim 1, wherein the element made of carbon is a brake disk and wherein the element comprised of the at least first and second portions is a friction pad.
5. The friction brake as claimed in claim 4, wherein the first and second portions are connected together in butted fashion.
6. The friction brake as claimed in claim 4, wherein one of the first and second portions is embedded in the other of the first and second portions with a contact surface of such one of the first and second portions substantially held in flush with a corresponding contact surface of such other of the first and second portions.
7. The friction brake as claimed in claim 1, wherein the ferrous material is selected from the group consisting of carbon steel and gray cast iron.

* * * * *